2,695,549

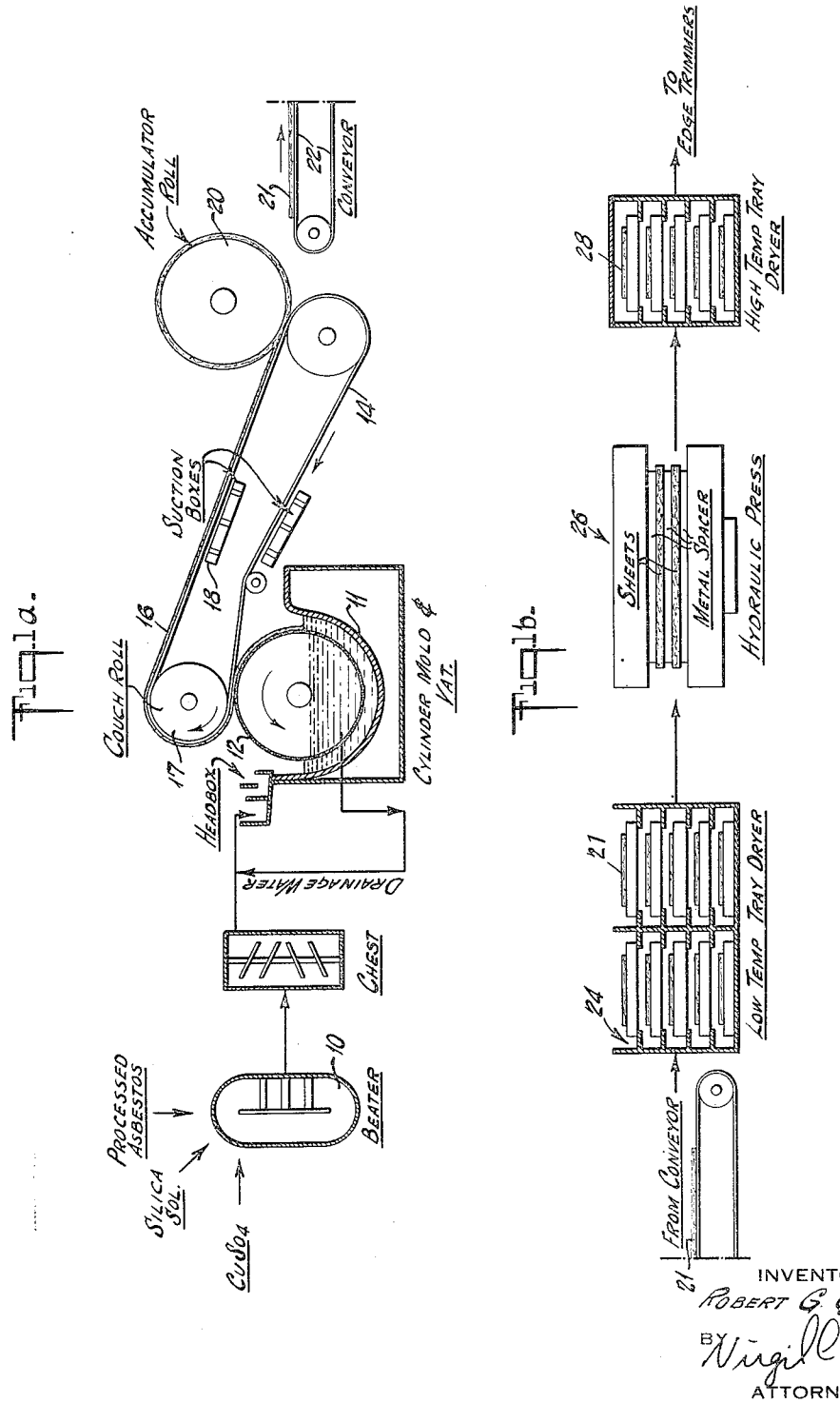

ASBESTOS MILLBOARD AND METHOD OF MANUFACTURE

Robert G. Quinn, Bound Brook, N. J., assignor to Johns-Manville Corporation, New York, N. Y., a corporation of New York Application February 17, 1949, Serial No. 76,960

9 Claims. (Cl. 92—39)

The present invention relates to asbestos millboard, and is particularly concerned with asbestos millboard of high strength and durability, and a method of manufacturing the same.

An object of the invention is to provide an asbestos millboard which will exhibit high and stable strength and dielectric properties under prolonged exposure to temperatures as high as 500° F.

Another object is to provide an asbestos millboard which is substantially volume stable under exposure to alternate moist and dry atmospheres.

With the above objects in view, the invention consists in the improved asbestos millboard and method of manufacture which are hereinafter described and more particularly defined by the accompanying claims.

In the following description reference will be made to the attached drawing, in which the two Figures, 1a and 1b, present in two parts a diagrammatic flow sheet of asbestos millboard forming equipment including successive air drying, wet pressing and heat drying stages.

The asbestos millboard of the present invention comprises a multi-ply asbestos paper laminate in which the individual plies comprise asbestos paper sheets of two to three mil thickness which may be built up on an accumulator roll to form a final board comprising 5–50 or more plied asbestos paper sheets. The individual asbestos paper sheets usually comprise chiefly felted finely fiberized and clean soft paper grade chrysotile asbestos fibers. However, a substantial proportion of the asbestos fibers, up to say 50% of the total fiber content by weight, may comprise harsh heat treated chrysotile fibers having free filtering properties imparted by flash heat calcining to temperatures in the range 900–1200° F. during a few seconds heat exposure to hot gas while suspended therein at calcining temperatures.

A preferred binder for the asbestos millboard comprises an amorphous insoluble form of silicic acid which may be present in amounts ranging from 3% to 25% by weight of the asbestos fibers present in the final sheet product. The binder is uniformly distributed throughout the sheet either by incorporating silicic acid sol in the furnish from which the paper sheets are formed during a conventional paper forming fiber felting operation, or by impregnation of the wet formed sheet prior to press consolidation and heat drying.

The silicic acid sol should have a high silica content and purity, together with sufficient stability against gelling to permit of its use in a commercial asbestos paper forming operation. As an example of a silicic acid sol which has been found practicable for use in accordance with the present invention, the following specifications are presented: pH 9–10; $SiO_2$ concentration 10–13%; and caustic soda equivalent of approximately 0.1%. The small caustic soda equivalent is desirable to stabilize the silicic acid sol against gelling. A sol of this type may be prepared, for example, by reacting an aqueous solution of sodium silicate with a dilute acid such as sulfuric acid, permitting the crude silica sol thus formed to set a gel, draining off the residual aqueous liquor, crushing the gel, thoroughly washing the crushed gel with water, and redissolving the washed gel in lightly causticized hot water to form a silicic acid sol having approximately the concentration indicated.

In forming the furnish previously fiberized and cleaned asbestos fibers are subjected to a fine fiberizing treatment in a conventional paper beater 10. The silica sol, with or without other suitable inorganic binder such as bentonite, is added to the fiber stock in the beater prior to completion of the beater cycle. After thorough mixing the silica sol binder may be coagulated on the fibrous stock by adding to the stock in the beater an amount of copper sulfate which is equivalent to about 0.1% of the dry weight of the silica present in the silica sol. This very small amount of copper sulfate is effective for coagulation of the silica sol on the fibers.

The individual asbestos paper sheets may be produced by supplying to a vat 11 of the machine a furnish which may, for example, comprise 3–25 parts by weight of silicic acid sol [$Si(OH)_n$, where $n=4$ or more] and 75–97% of fine clean chrysotile asbestos fibers dispersed in water. The furnish has a solids concentration not substantially exceeding 1% by weight. The paper is shown as produced on a cylinder machine having a cylinder mold 12 which engages the underside of an endless forming felt 14. A thin web of the furnish is picked up by the cylinder mold and transferred to the surface of the felt 14 in forming a wet sheet 16 of paper of two to three mil thickness. The felt carries the wet paper sheet around a couch roll 17 and thence over suction boxes 18, whereby the water content is reduced to approximately 55–65% by weight of the sheet.

The partially dewatered paper 16 is then wound on a rotating accumulator roll 20 to form a laminated sheet in the form of a cylinder. After a multi-ply sheet of suitable thickness has been built up on the accumulator roll, the sheet is removed from the roll by longitudinally severing the laminated sheet cylinder and removing it from the roll surface. The resulting sheet 21 is flattened and transferred to a conveyor 22 which delivers it to drying, consolidation and curing equipment.

The moist multi-ply laminate sheets 21 are subjected to the following treatment to develop requisite strength and volume stability. The initial step consists in subjecting the sheet to a circulating air drying treatment, as in a tray drier 24, for a period of time sufficient to reduce the moisture content from an initial of about 60% to a moisture content of 35–45%. This initial air drying step is carried out at substantially normal air temperature for best results. At the completion of this initial low temperature drying operation each of the moist sheets 21 is placed between sheet metal spacers and platens of a press 26 and is subjected to a pressure of about 800–1200 lbs./sq. in., or to such pressure as will reduce its thickness by an amount between 25% and 40% of the original caliper of the moist sheet. This pressing operation, at the pressures indicated, can be safely carried out between non-pervious flat press spacers and platens without danger of rupture or injury to the sheet, while the sheet has a moisture content in the indicated range of 35–45%. The thus consolidated moist sheets are then subjected to a final heat curing and drying treatment in a heat drier 28 operating at normal drier temperatures of say 220–300° F.

The resulting dried millboard sheets have comparatively high density in the range 55–75 lbs./cu. ft., and retain an exceptional amount of flexibility in comparison with similar products now on the market. A principal reason for this flexibility is that by following the practice of effecting the initial drying and pressure consolidation treatment at normal temperatures, whereby to slowly reduce the moisture content of the raw board to a value not exceeding 45% of the weight of the board, before any heat curing treatment, an opportunity is given for the silicic acid sol to convert to insoluble amorphous silicic acid gel, prior to heat treatment. Once the insoluble silicic acid gel is formed it will retain its amorphous state throughout a heat curing cycle. On the other hand, if an attempt is made to heat cure the silicic acid sol without first permitting its conversion to an amorphous insoluble gel form, the early rapid heat cure converts the sol directly to a crystalline form of silicic acid, without any opportunity for formation of an amorphous gel stage. Once a crystalline silicic acid has been formed by an irreversible reaction, such crystalline hydrous silica imparts brittleness and reduces tensile strength and flexibility, as compared to boards made in accordance with the method herein described.

The board which results from suitably controlled drying treatment is greatly improved as to wet strength, and exhibits some improvement as to dry tensile strength, as a result of the presence of the hydrous silica in an amorphous state throughout the structure of the board. However, the improvement in dry tensile strength does not compare with the improvement in wet tensile strength, and accordingly it is advantageous in many cases to supplement the silica sol binder with a plastic inorganic binder such as bentonite clay. The bentonite clay contributes little to the wet strength of the resulting paper, and improves the dry tensile strength. Suitable binders in accordance with the present invention comprise silica sol alone, or mixtures of silica sol and bentonite in proportions ranging from 1-3 parts of $SiO_2$ to 3-1 parts of pure and finely divided bentonite.

As illustrating the effect of the presence of an amorphous silicic acid binder on the wet tensile strength of a paper, it has been found that as little as 5% by weight of such amorphous silica will increase the wet tensile strength of an asbestos paper by as much as 800%. However, the presence of an excessive amount of amorphous silicic acid in paper has an adverse effect on the flexibility of the paper. Furthermore the amorphous silicic acid binder does not greatly improve the dry tensile strength of the paper, as evidenced by the fact that the presence of 5% by weight of amorphous silicic acid as a binder only improves the dry tensile strength of an asbestos paper by 40-50%, in comparison with a paper embodying no binder. The dry tensile strength of an asbestos paper embodying 5%-15% bentonite is considerably higher than that of an asbestos paper which contains no binder or an equivalent amount of silicic acid binder. Thus it is frequently advantageous in accordance with the present invention to employ as binders 5-10% to 25% by weight of the paper of mixtures of silicic acid sol and bentonite in the proportions of say 5%-15% $SiO_2$ to 15%-5% bentonite, based on the dry weight of the resulting paper.

By the present method asbestos millboards have been produced having dry tensile strengths of 500-700 lbs./sq. inch and having a modulus of rupture of about 1000 lbs./sq. inch, using amorphous silicic acid as the sole binder in amount not exceeding 25% by weight of the board. The binder is uniformly distributed throughout the board, so that the internal plies are as strong as the outer plies. Such boards have dielectric strengths of at least about 40 volts/mil thickness, and have good surface arc resistance of at least 400 seconds by standard A. S. T. M. test.

The invention which has been thus described by detailed example is not limited as to such details and it is to be understood that variations, changes and modifications are contemplated within the scope of the invention as defined by the following claims.

What I claim is:

1. In manufacturing asbestos sheets the steps comprising, forming a wet asbestos fiber sheet having uniformly distributed therethrough 3-25% of the dry weight of the sheet of an alkaline silicic acid sol, air drying the wet sheet at substantially normal temperature to reduce its moisture content within the approximate range 35-45% by weight, pressure consolidating the resulting moist sheet, and subjecting the thus consolidated sheet to a heat treatment to dry the sheet.

2. In producing an asbestos millboard the steps comprising, forming a wet asbestos fiber paper having uniformly distributed therethrough 3-25% of the dry weight of the paper of an alkaline silicic acid sol, forming a multi-ply laminate board of the thus treated paper, air drying the resulting wet board at substantially normal temperature to reduce its moisture content within the approximate range 35-45% by weight, pressure consolidating the resulting moist board under pressure within the range 800-1200 lbs./sq. in., and subjecting the thus consolidated sheet to a heat treatment to dry the sheet.

3. In manufacturing asbestos sheets the steps comprising, forming a wet asbestos fiber sheet having uniformly distributed throughout the sheet 5-25% of the dry weight of the sheet of an alkaline silicic acid sol and finely divided bentonite clay, air drying the wet sheet at substantially normal temperature to reduce its moisture content within the approximate range 35-45% by weight, pressure consolidating the resulting moist sheet, and subjecting the thus consolidated sheet to a heat treatment to dry the sheet.

4. In producing an asbestos millboard the steps comprising, forming a wet asbestos fiber paper having uniformly distributed throughout the paper 5-25% of the dry weight of the paper of an alkaline silicic acid sol and finely divided bentonite clay, forming a wet multi-ply laminate board of the thus treated paper, air drying the wet board at substantially normal temperature to reduce its moisture content within the approximate range 35-45% by weight, pressure consolidating the resulting moist board under pressure within the range 800-1200 lbs./sq. in., and subjecting the thus consolidated board to a heat treatment to dry the board.

5. In manufacturing asbestos sheets the steps comprising, forming a dilute aqueous furnish comprising asbestos fibers, alkaline silicic acid sol and approximately 0.1% of the silica content of the sol of copper sulphate coagulating agent, depositing from said furnish a water-laid asbestos sheet, subjecting the sheet to a pressing and partial de-watering treatment, air drying the resulting sheet at substantially normal temperaure to reduce its moisture content within the approximate range 35-45% by weight, pressure consolidating the resulting moist sheet, and subjecting the thus consolidated sheet to a heat treatment to dry the sheet.

6. In manufacturing asbestos millboard the steps comprising, forming a dilute aqueous furnish comprising a mixture of soft and harsh chrysotile asbestos fibers, alkaline silicic acid sol and approximately 0.1% of the silica content of the sol of copper sulfate coagulating agent, depositing from said furnish a water-laid asbestos paper, subjecting said freshly formed paper felt to a conventional roll pressing and partial dewatering treatment, building up a multi-ply laminate of the paper, air drying the resulting laminate sheet to reduce its moisture content within the approximate range 35-45% by weight, pressure consolidating the moist sheet to reduce its thickness caliper 25-40%, and subjecting the thus consolidated sheet to a heat drying treatment to dry the sheet.

7. A product formed by the process defined in claim 1.
8. A product formed by the process defined in claim 2.
9. A product formed by the process defined in claim 4.

References Cited in the file of this patent

UNITED STATES PATENTS

| Number | Name | Date |
|---|---|---|
| 354,158 | Martin | Dec. 14, 1886 |
| 1,064,893 | Dreher | June 17, 1913 |
| 1,725,647 | Kirschbraun | Aug. 20, 1929 |
| 2,006,392 | Greider et al. | July 2, 1935 |
| 2,034,522 | Loetscher | Mar. 17, 1936 |
| 2,037,522 | Lundback | Apr. 4, 1936 |
| 2,335,722 | Adams | Nov. 30, 1943 |
| 2,355,006 | Millspaugh | Aug. 1, 1944 |
| 2,373,914 | Quinn | Apr. 17, 1945 |
| 2,399,981 | Britt | May 7, 1946 |
| 2,408,656 | Kirk | Oct. 1, 1946 |
| 2,445,415 | Anderson | July 20, 1948 |
| 2,447,725 | Adams et al. | Aug. 24, 1948 |
| 2,448,186 | Miller et al. | Aug. 31, 1948 |
| 2,485,458 | Quinn | Oct. 18, 1949 |
| 2,531,016 | Waechter | Nov. 21, 1950 |
| 2,565,340 | Anderson | Aug. 21, 1951 |

FOREIGN PATENTS

| Number | Country | Date |
|---|---|---|
| 554,131 | Great Britain | June 22, 1943 |